United States Patent
Best et al.

(10) Patent No.: US 8,295,118 B2
(45) Date of Patent: Oct. 23, 2012

(54) SELF-TIMED INTERFACE FOR STROBE-BASED SYSTEMS

(75) Inventors: Scott C. Best, Palo Alto, CA (US); Jade M. Kizer, Mountain View, CA (US)

(73) Assignee: Rambus Inc., Sunnyvale, CA (US)

( * ) Notice: Subject to any disclaimer, the term of this patent is extended or adjusted under 35 U.S.C. 154(b) by 0 days.

(21) Appl. No.: 12/721,520

(22) Filed: Mar. 10, 2010

(65) Prior Publication Data

US 2010/0254204 A1     Oct. 7, 2010

Related U.S. Application Data

(63) Continuation of application No. 11/080,613, filed on Mar. 14, 2005, now Pat. No. 7,688,672.

(51) Int. Cl.
*G11C 8/00* (2006.01)
(52) U.S. Cl. ................................ 365/233.1
(58) Field of Classification Search ............... 365/233.1, 365/233.11, 193, 194; 711/167; 375/360; 326/96
See application file for complete search history.

(56) References Cited

U.S. PATENT DOCUMENTS

| | | | |
|---|---|---|---|
| 4,687,954 A | 8/1987 | Yasuda et al. ............... | 327/206 |
| 5,334,883 A | 8/1994 | Rosenthal .................... | 327/206 |
| 5,341,371 A | 8/1994 | Simpson ...................... | 370/85.4 |
| 5,948,083 A | 9/1999 | Gervasi ......................... | 710/62 |
| 5,978,281 A | 11/1999 | Anand et al. ............. | 365/189.05 |
| 6,055,587 A | 4/2000 | Asami et al. ................. | 710/49 |
| 6,279,073 B1 | 8/2001 | McCracken et al. ......... | 711/105 |
| 6,396,887 B1 | 5/2002 | Ware ........................... | 365/354 |
| 6,466,491 B2 | 10/2002 | Yanagawa ................... | 365/194 |
| 6,498,766 B2 | 12/2002 | Lee et al. .................... | 365/233 |
| 6,512,704 B1 | 1/2003 | Wu et al. ................. | 365/189.07 |
| 6,570,800 B2 | 5/2003 | Tanaka ......................... | 365/219 |
| 6,646,929 B1 | 11/2003 | Moss et al. .................. | 365/194 |
| 6,707,723 B2 | 3/2004 | Jeong ..................... | 365/189.05 |
| 6,735,709 B1 | 5/2004 | Lee et al. ..................... | 713/401 |
| 6,782,459 B1 | 8/2004 | Ware .......................... | 711/167 |
| 6,819,157 B2 | 11/2004 | Cao et al. .................... | 327/262 |
| 6,889,334 B1 | 5/2005 | Magro et al. ................ | 713/500 |
| 6,898,682 B2 | 5/2005 | Wekler et al. ............... | 711/163 |
| 6,930,932 B2 | 8/2005 | Rentschler .................. | 365/193 |
| 6,940,760 B2 | 9/2005 | Borkenhagen et al. .. | 365/189.05 |
| 6,940,768 B2 | 9/2005 | Dahlberg et al. ........... | 365/201 |
| 6,941,433 B1 | 9/2005 | Libby et al. ................ | 711/167 |
| 7,031,205 B2 | 4/2006 | Han et al. .................... | 365/193 |
| 7,107,424 B1 | 9/2006 | Avakian et al. ............. | 711/167 |

(Continued)

OTHER PUBLICATIONS

Ryan, Kevin, "DDR SDRAM Functionality and Controller Read Data Capture," Micron Technology, Inc. DesignLine, 1999, pp. 1-24, vol. 8, Issue 3. (24 pages).

(Continued)

*Primary Examiner* — Douglas King
(74) *Attorney, Agent, or Firm* — Mahamedi Paradice Kreisman LLP; Lance M. Kreisman

(57) ABSTRACT

A method is disclosed comprising detecting an edge-transition of a strobe signal using hysteresis, the strobe signal originating in a first clock domain. A count is controlled in a first direction in response to the detected edge-transition. The count is controlled in a second direction in response to an edge-transition of a clock signal, the clock signal originating in a second clock domain. Data is interfaced between the first and second clock domains in response to the count.

23 Claims, 8 Drawing Sheets

U.S. PATENT DOCUMENTS

| | | | |
|---|---|---|---|
| 7,259,606 B2 | 8/2007 | Ku et al. .................. | 327/235 |
| 2001/0020278 A1 | 9/2001 | Saito ........................ | 713/400 |
| 2001/0032067 A1 | 10/2001 | Nemani et al. ............ | 703/14 |
| 2002/0009004 A1 | 1/2002 | Hamada et al. ........... | 365/201 |
| 2002/0021616 A1* | 2/2002 | Keeth et al. ............... | 365/233 |
| 2002/0196883 A1* | 12/2002 | Best et al. ................. | 375/355 |
| 2003/0081707 A1* | 5/2003 | Takeuchi et al. .......... | 375/354 |
| 2003/0218504 A1* | 11/2003 | Nguyen et al. ............ | 330/279 |
| 2004/0044919 A1 | 3/2004 | Dabral ...................... | 713/400 |
| 2004/0068682 A1* | 4/2004 | Takei et al. ............... | 714/700 |
| 2004/0084537 A1 | 5/2004 | Best .......................... | 235/492 |
| 2005/0141294 A1 | 6/2005 | Bonelli ..................... | 365/193 |

OTHER PUBLICATIONS

Ajanta Chakraborty: "Efficient Self-Timed Interfaces for Crossing Clock Domains," thesis submitted to the Department of Computer Science, University of British Columbia (Bhopal Engineering College), Aug. 2003, 74 pgs.

Horowitz, Hill: "The Art of Electronics" (second edition), 1989, Cambridge, p. 231-232.

International Search Report and Written Opinion of the International Searching Authority in International Application PCT/US2006/008610, World Intellectual Property Organization, EPO, Jul. 7, 2006, 12 pgs.

Altera, "Using Source-Synchronous Signaling with DPA in Stratix GX Devices," Application Note 236, pp. 1-18, Altera Corporation, Jan. 2003, available at http://www.altera.com/literature/an/an236.pdf.

Schumann, T. and Klar, H., "An Asynchronous up/down Counter for Control of a Self-timed, Wave-pipelined Array Multiplier," Abstract, ACiD-WL Workshop, Groningen, the Netherlands, Sep. 1996, available at http://mikro.ee.tuberlin.de/forschung/sgemos/abstractACiD.ps.gz. (1 pages).

International Preliminary Report on Patentability and Written Opinion of the International Searching Authority in International Application PCT/US2005/028709, European Patent Office, Mar. 1, 2007. (13 pages).

Office Action with mail date of Oct. 15, 2010 re Application No. 12/694,251 includes Notice of References cited. 13 Pages.

Response dated Feb. 15, 2011 to the Non-Final Office Action mailed Oct. 15, 2010 re U.S. Appl. No. 12/694,251. 17 Pages.

Information Disclosure Statement with mail date of Apr. 1, 2011 re U.S. Appl. No. 12/694,251. 6 Pages.

Final Office Action dated Apr. 29, 2011 re U.S. Appl. No. 12/694,251 includes Notice of Reference Cited and Information Disclosure Statement. 12 Pages.

Response dated Jun. 22, 2011 to the Final Office Action mailed Apr. 29, 2011 re U.S. Appl. No. 12/694,251. 8 Pages.

Notice of Allowance and Fee(s) Due dated Jul. 8, 2011 re U.S. Appl. No. 12/694,251 includes Notice of References Cited. 17 Pages.

Office Action dated Jul. 14, 2011 re U.S. Appl. No. 12/477,092 includes Notice of References Cited. 11 Pages.

* cited by examiner

SELF-TIMED INTERFACE FOR STROBE-BASED SYSTEMS

RELATED APPLICATIONS

This application is a continuation of U.S. patent application Ser. No. 11/080,613, filed Mar. 14, 2005, now U.S. Pat. No. 7,688,672 entitled SELF-TIMED INTERFACE FOR STROBE-BASED SYSTEMS, which is hereby incorporated by reference in its entirety.

TECHNICAL FIELD

The disclosure herein relates generally to strobe-based data receiver circuits, systems and methods. In particular, this disclosure relates to systems and methods for generating a self-timed read-enable signal for strobe-based data receiver circuits.

BACKGROUND

Strobe-based data signaling is common in many memory systems, such as "Double Data Rate Synchronous DRAM" (DDR-SDRAM) and its related variants. In such systems, reception or sampling of data under control of a strobe signal involves use of the strobe signal to generate sample clock signals that control sampling instants of a receiver associated with a data line or pin of the memory component. Once the data transmitted by the DRAM during a "read" operation (i.e., the read-data) is sampled by the receiver circuitry on the memory controller, that data must be reliably transferred into the core of the memory controller, for continued processing. While the core-clock of the memory controller and the clock of the memory channel are typically the same frequency, the arriving data-strobe signal is of arbitrary phase with respect to the core-clock of the memory controller.

Figure 1:
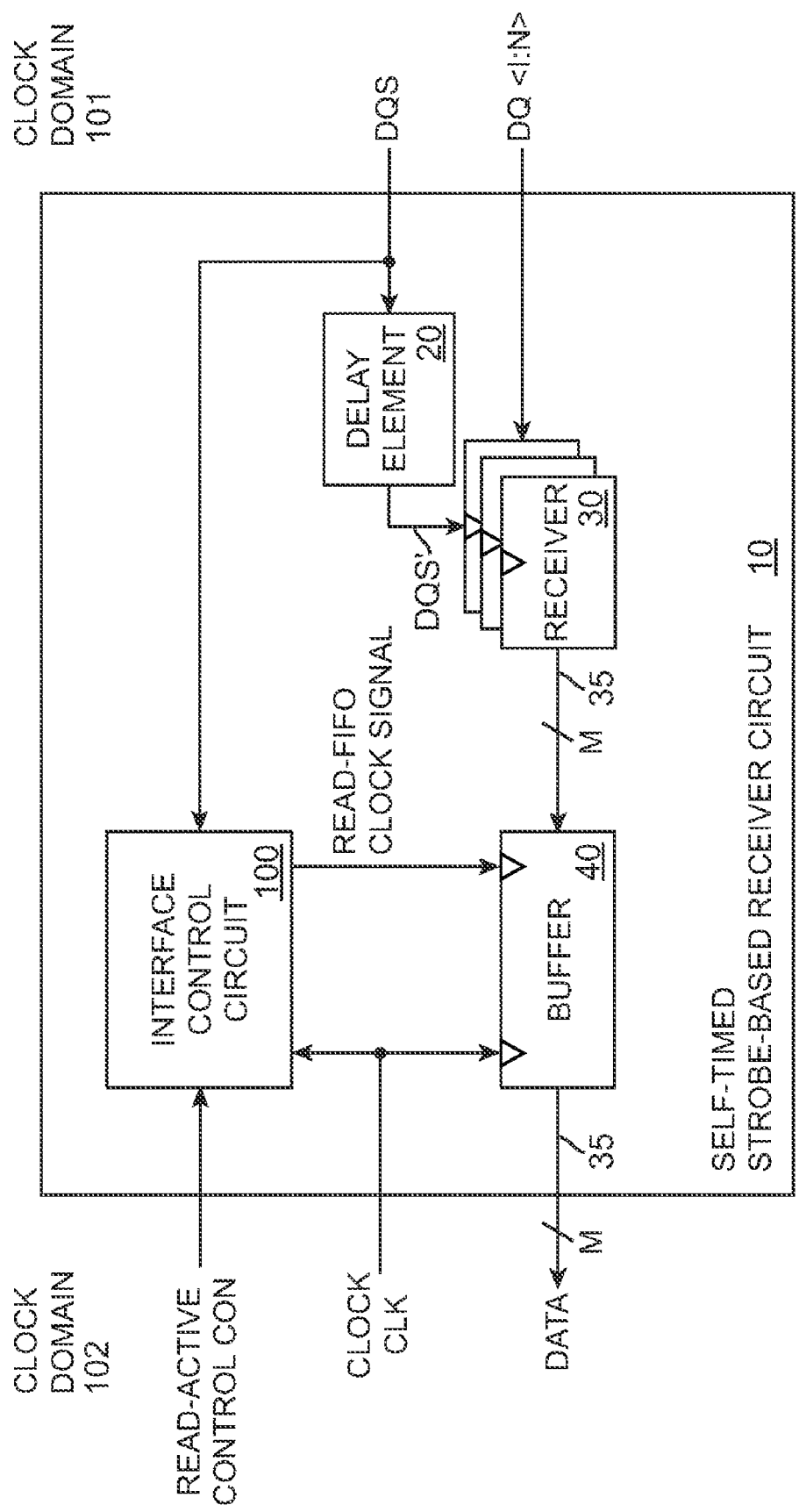
FIG. 1 is a block diagram of a self-timed strobe-based receiver circuit that includes an interface control circuit for generating a self-timed read-enable signal, under an embodiment.

In the drawings, the same reference numbers identify identical or substantially similar elements or acts. To easily identify the discussion of any particular element or act, the most significant digit or digits in a reference number refer to the Figure number in which that element is first introduced (e.g., element 100 is first introduced and discussed with respect to FIG. 1).

DETAILED DESCRIPTION

In an embodiment, a "clock-domain crossing" circuit may be required to reliably bridge an interface between a memory controller core, and a memory interface circuit which operate in different clock domains. One approach may utilize a "First-In, First-Out" ("FIFO") buffer. Because the memory-interface circuit and the associated strobe and data signals are bi-directional between the memory controller and the DRAM, it becomes necessary to gate the FIFO buffer so that it is only active during "read" operations (i.e., when data is being transmitted from the DRAM and sampled by receiver circuits whose timing instants are controlled by the strobe signal). The signal which controls the FIFO operation may be referred to as the "read-enable signal"—when it is active, data from the input receiver circuitry will be transferred into the buffer under control of the data-sampling signal. Once data is stored in the FIFO, it can be transferred out and into the memory-controller core using a clock synchronous with the memory-controller core logic circuitry.

Self-timed data-receiver systems and methods for strobe-based data interfaces are provided below. These systems and methods, referred to herein as "self-timed interface circuits" or "self-timed interfaces", receive a strobe signal (also referred to as "DQS", "sample signal", and "data strobe") from a component operating under a first clock domain. A first signal path of the self-timed interface couples the strobe signal DQS to a receiver or input sampler through a strobe-delay element. The receiver samples data received on a pin or data line, where the signal of the data line corresponds to the strobe signal DQS and operates under the same clock domain as the strobe signal DQS. A second signal path of the self-timed interface couples the strobe signal DQS to an interface control circuit through a hysteresis-buffer element. The interface control circuit, which receives (as input) the output of the hysteresis-buffer element (referred to as a buffered strobe signal), a read-active signal that originates under a second clock domain, and a clock signal that originates under a second clock domain, generates a read-enable signal. The read-enable signal gates the buffered strobe signal to generate a read-FIFO clock signal for use in controlling data transfers into the FIFO buffer which interfaces the first and second clock domains.

The interface control circuit of an embodiment includes a counter circuit that couples to receive the buffered strobe signal. The counter circuit also couples to receive the clock signal gated by a control signal (i.e., the read-active signal) that originates in the same clock domain as the clock signal. Edge transitions of each of the buffered strobe signal and the gated clock signal control a count of the counter. The counter circuit generates the read-enable signal in response to the count being at a pre-specified count value. As above, the read-enable signal gates the buffered strobe signal to generate the read-FIFO clock signal.

The gating of signals by the self-timed interfaces of an embodiment (gating the clock signal with a control signal, and gating the buffered strobe signal with the read-enable signal) each involve signals that originate in the same clock domain. This gating of signals originating in the same clock domain therefore eliminates the uncertainty and inaccuracy associated with gating a first clock signal with a control signal generated in a second clock domain.

The self-timed interface is for use in strobe-based systems that include strobe-based memory systems for example. The strobe-based memory systems may include double data rate (DDR) systems like DDR SDRAM as well as DDR2 SDRAM and other DDR SDRAM variants, such as reduced latency DRAM (RLDRAM), RLDRAM2, Graphics DDR (GDDR) and GDDR2, GDDR3, to name a few, but are not limited to these memory systems.

In the following description, numerous specific details are introduced to provide a thorough understanding of, and enabling description for, embodiments of the self-timed interface. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments. As an example, the self-timed interface embodiments described herein are presented in the context of transferring individual data bits DQ<X> (where DQ<X> represents any one of a number of data lines DQ<1:N>, where X is any of data lines 1, 2 . . . N) using corresponding strobe signals DQS with the understanding that the disclosed concepts apply to all data transfers for all bits DQ<1> thru DQ<N>.

FIG. 1 is a block diagram of a self-timed strobe-based receiver circuit 10 that includes an interface control circuit 100 for generating a read-FIFO clock signal, under an embodiment. The interface control circuit 100 is a component of and/or coupled to one or more systems or devices (not shown) as appropriate to a system/device hosting the self-timed strobe-based receiver circuit 10. The self-timed strobe-based receiver circuit 10 transfers data between first 101 and second 102 clock domains of the host system.

The self-timed strobe-based receiver circuit 10 includes one or more receivers (or data-samplers) 30, a strobe-delay circuit 20, one or more FIFO buffers 40, and the interface control circuit 100, but is not limited to these components. Each of the receivers 30 couple to sample one of the data signals DQ<1:N> of individual data pins or lines originating from one or more components (not shown) in the first clock domain 101, but are not so limited. The receivers 30 sample data of the pins/lines under control of a delayed strobe signal DQS'. The self-timed strobe-based receiver circuit 10 of an embodiment includes a delay element 20 that couples to receive the input strobe signal DQS and in turn generates a delayed strobe signal DQS', where an amount of the delay is as appropriate to the relative timing between the data signal DQ and the corresponding strobe signal DQS (typically 90-degrees, or one-quarter of the memory-clock cycle).

The M-bit side FIFO buffer 40 couples to the M outputs of the receivers 30 to transfer the sampled data from the receivers 30 to a component in the second clock domain 102 via data lines 35. In typical strobe-based memory systems, M=2*N, but other embodiments are not limited to this relationship. Read data is loaded into the FIFO buffer 40 under control of the read-FIFO clock signal, which is generated by the interface control circuit 100. Read data is transmitted to one or more components (not shown) operating in the second clock domain 102 under control of clock signal CLK.

The interface control circuit 100 couples to receive the strobe signal DQS, the clock signal CLK which embodies the timing of the second clock domain 102, and a read-active control signal ("CON"), where the control signal CON couples to the interface control circuit 100 from a component operating under the second clock domain 102. The interface control circuit 100 generates the read-FIFO clock signal using information of the strobe signal DQS, the clock signal CLK, and the control signal CON, as described below, and couples the read-FIFO clock signal to the FIFO buffer 40.

Figure 2:
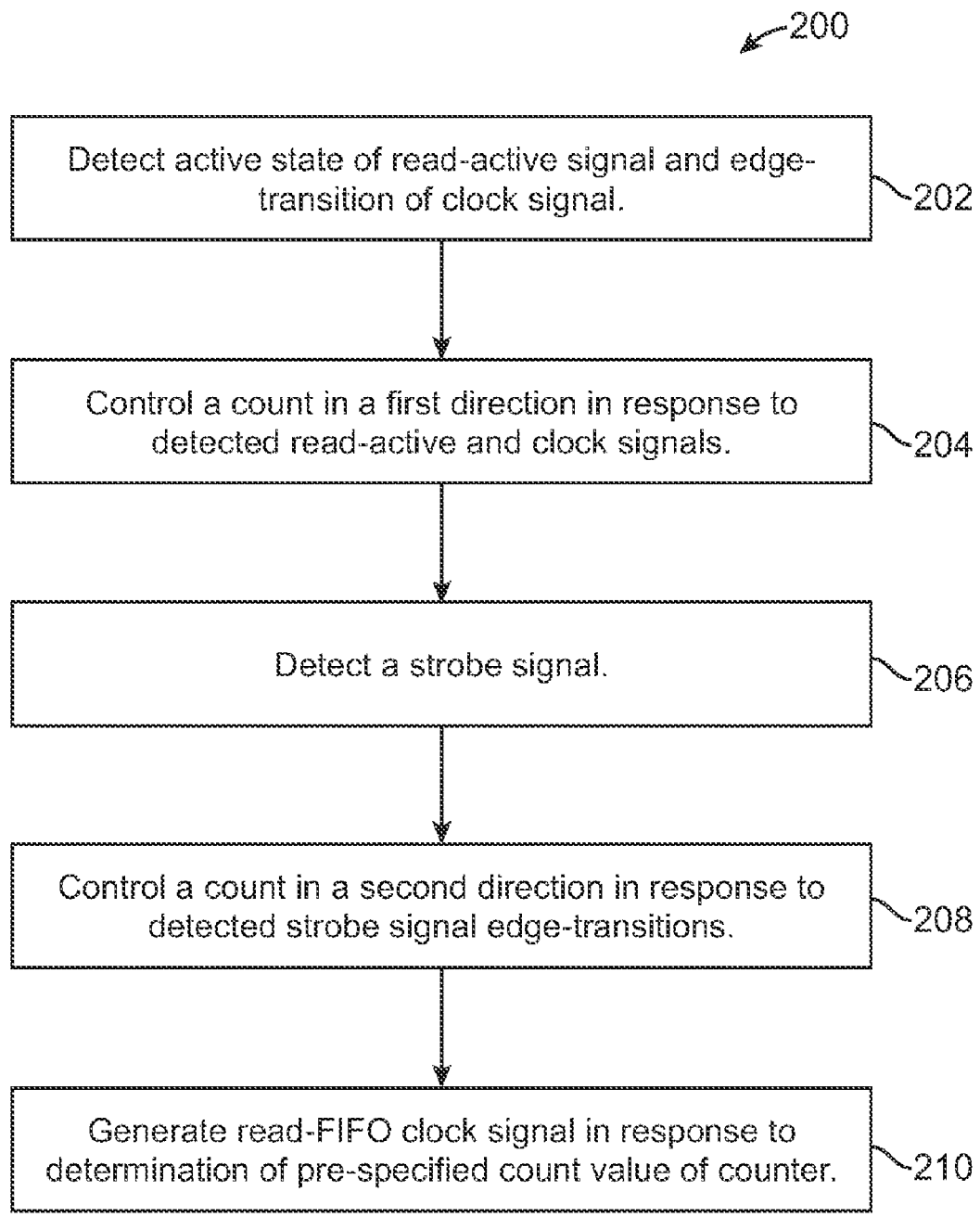
FIG. 2 is a flow diagram for transferring data between different clock domains using an interface control circuit, under an embodiment.

FIG. 2 is a flow diagram 200 for transferring data between different clock domains using a self-timed strobe-based receiver circuit, under an embodiment. Components of the self-timed strobe-based receiver circuit detect the active-state of the read-active signal CON, as well as an edge-transition of the clock signal CLK at block 202. This detection controls a count in a first direction (e.g., the count increments) within the self-timed strobe-based receiver circuit, at block 204. The self-time strobe-based receiver circuit then detects a strobe signal DQS, at block 206. The detection includes hysteresis-based detection that generates a buffered output signal in response to transitions of the strobe signal across at least one of a first voltage threshold and a second threshold voltage, but is not so limited. The self-timed strobe-based receiver circuit controls a count in a second direction (e.g., the count decrements) in response to the detected strobe signal edge-transition, at block 208. The self-timed strobe-based receiver circuit generates the read-FIFO clock signal in response to a determination the count is at a pre-specified count value (e.g., the count is non-zero), at block 210. The read-FIFO clock signal couples to the read buffer for use in controlling transfers of sampled data into the read buffer from one or more receivers.

Figure 3:
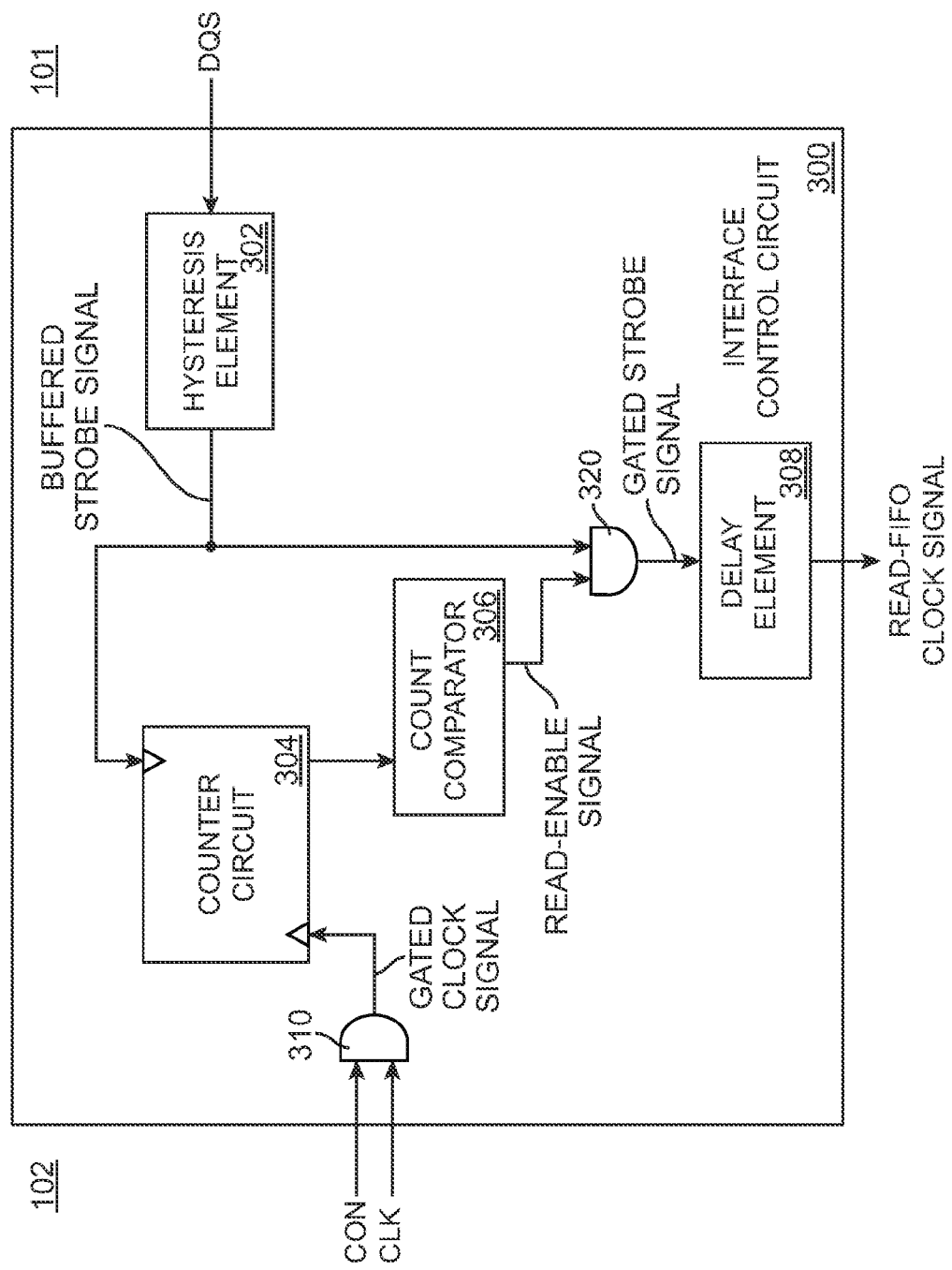
FIG. 3 is a block diagram of an interface control circuit, under an embodiment.

FIG. 3 is a block diagram of an interface control circuit 300 that generates read-FIFO clock signals, under an embodiment. The interface control circuit 300 includes a hysteresis element 302, a counter circuit 304, a comparator circuit 306, a delay element 308, and multiple logic circuits 310/320, as described below. The hysteresis element 302 couples to receive the strobe signal DQS into the interface control circuit 300 from the first clock domain 101. The hysteresis element 302 of an embodiment is a comparator or detector (e.g., a "Schmitt trigger") that uses hysteresis in order to better detect valid regions of the strobe signal DQS, thereby improving tolerance of the interface control circuit 300 to noise during high-impedance (inactive) states of the strobe signal DQS. The use of hysteresis improves tolerance to noise by changing the "trip-point" voltage thresholds at the input which would cause a signal transition at the output, where the signal which controls the "trip-point" change is typically the output signal itself. Consequently the hysteresis-based comparator 302 detects a valid region of a strobe signal DQS and generates a buffered strobe signal in response to transitions of the strobe signal DQS that place the voltage of the strobe signal DQS reliably above or below a voltage range bounded by the first and second voltage thresholds.

Figure 4:
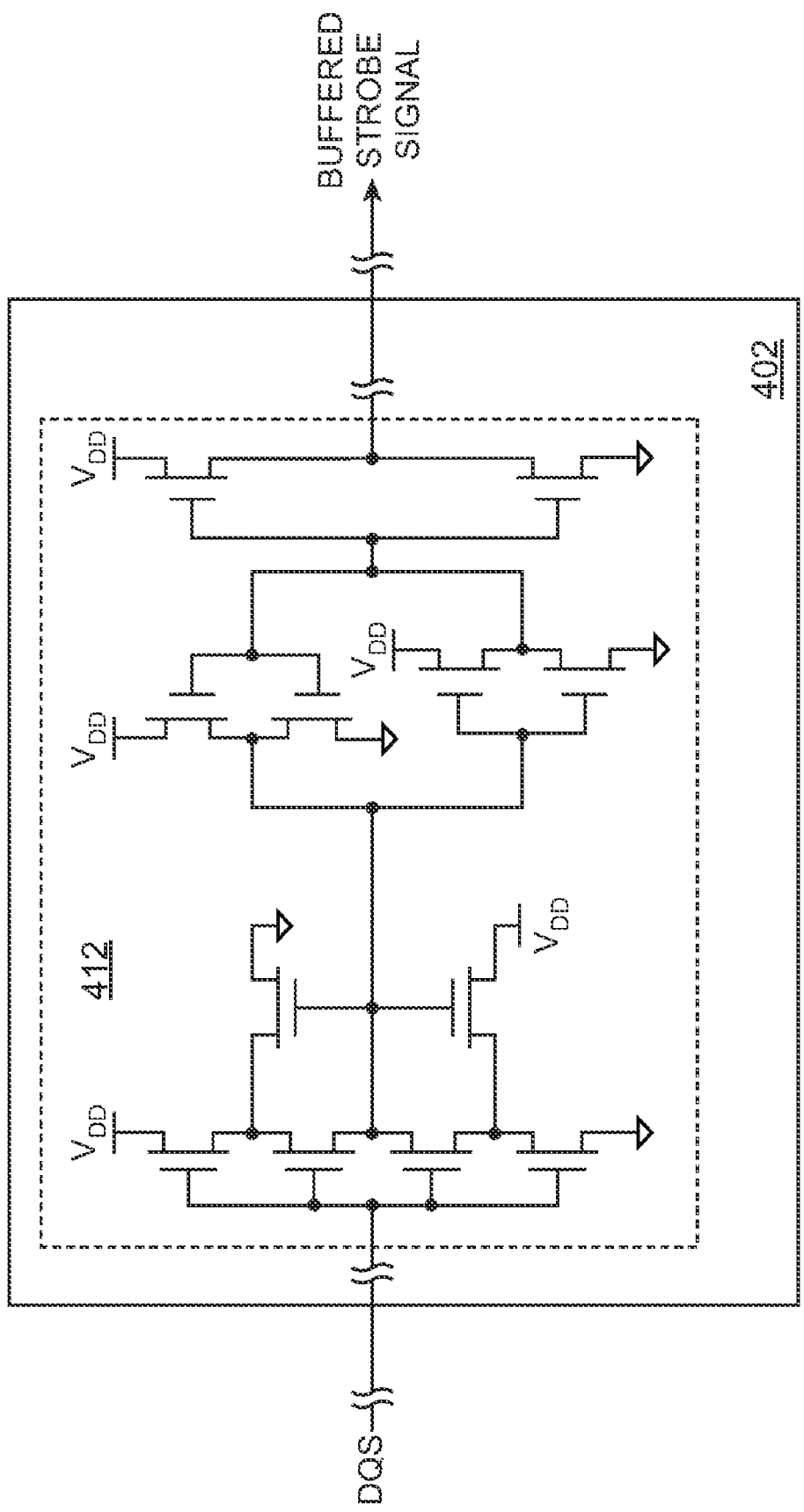
FIG. 4 is a schematic of a hysteresis buffer element that includes a Schmitt trigger circuit, under an embodiment.

As an example of a hysteresis element 302, FIG. 4 is a schematic of a hysteresis element 402 that includes a Schmitt trigger circuit 412, under an embodiment. In a strobe-based signaling system such as DDR-SDRAM, when the DQS signal is not active, it is in a high-impedance state. During this state, the voltage seen by an input receiver at the DQS pin will be approximately one-half of the power-supply voltage (i.e., "VDD" in FIG. 4) of the receiver circuit. This combination of high-impedance and half-VDD biasing would cause traditional input buffer circuits to become very sensitive to spurious noise signals.

To prevent noise events from causing unwanted state changes during the inactive state, the Schmitt trigger circuit 412 conditions the strobe signal DQS through the use of two input voltage thresholds, or "trip points". When the output of the Schmitt trigger is high (e.g., at VDD), for example, the input voltage threshold is adjusted to a low threshold value. In order to produce an output transition from high-to-low, an input signal's voltage would have to fall below this low threshold value. Similarly, when the output of the Schmitt trigger is low (e.g., at VSS), the input voltage threshold is adjusted to a second voltage threshold which is relatively higher than the first threshold value. In this condition, in order to produce an output transition from low-to-high, an input signal's voltage would have to rise above this high threshold. Such a "state-dependant input threshold" scheme generally provides immunity to unwanted state changes due to noise as long as the peak-to-peak amplitude of the noise is less than the difference between the threshold voltages.

Figure 5:
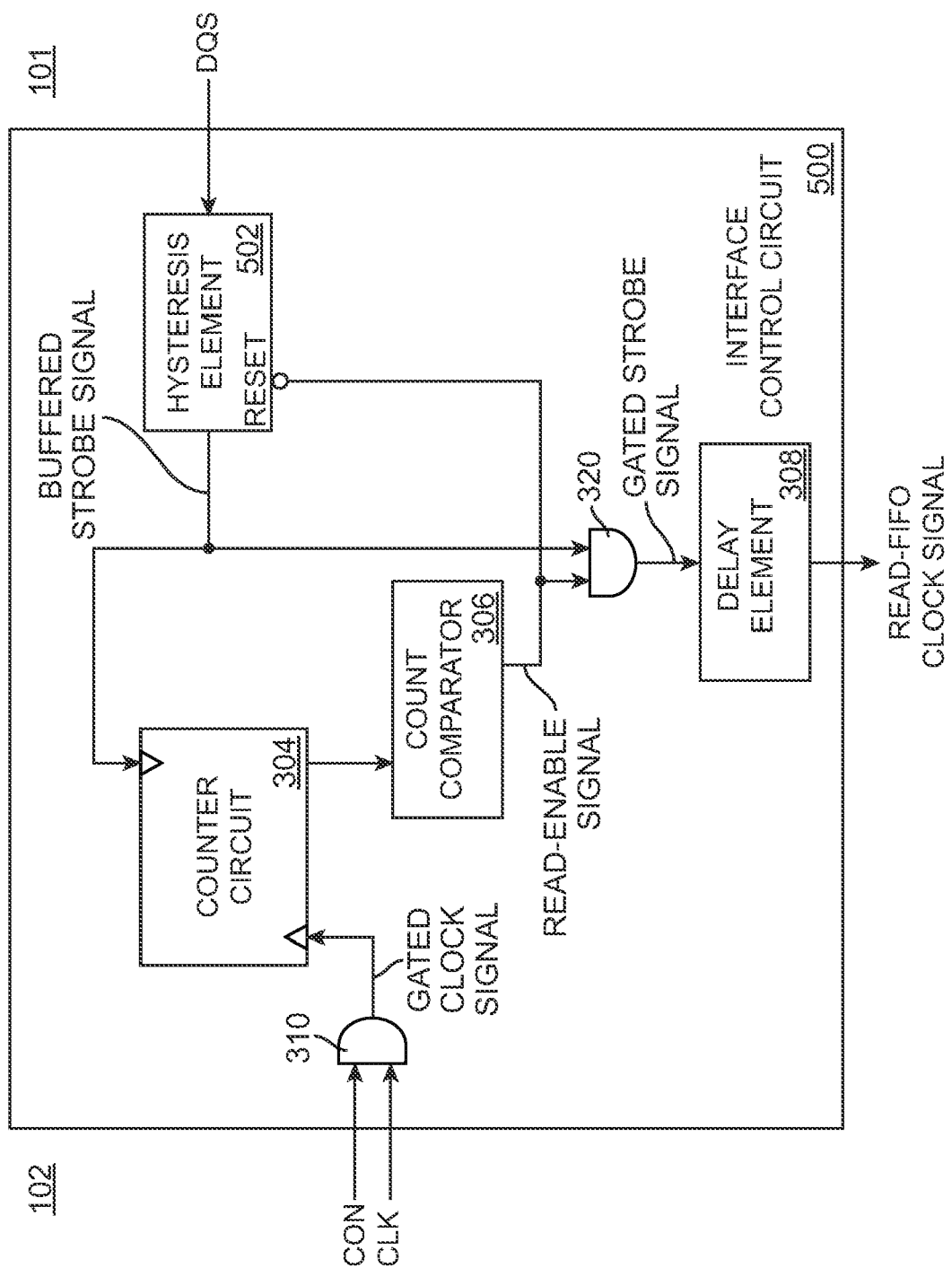
FIG. 5 is a block diagram of an interface control circuit that includes a hysteresis element with a reset control, under an embodiment.

The interface control circuit of an alternative embodiment includes a hysteresis element having a reset control. The interface control circuit couples a read-enable signal to the hysteresis element reset control in order to ensure the hysteresis element output is in a known state at the first instance of an active DQS signal. FIG. 5 is a block diagram of a interface control circuit 500 that includes a hysteresis element 502 with a reset ("RESET") control, under an embodiment. The hysteresis element 502 includes an active-low reset that resets the hysteresis element output in response to an asserted read-enable signal, but the embodiment is not limited to an active-low reset or to resetting in response to an active read-enable signal.

Returning to FIG. 3, the interface control circuit 300 couples the counter circuit 304 to receive the buffered strobe signal from the hysteresis element 302. The counter circuit 304 also couples to receive a clock signal CLK and a control signal CON through a logic circuit 310. Both the clock signal CLK and the control signal CON originate in the second clock domain 102. The first logic circuit 310 includes an AND gate, but alternative embodiments may use any combination of logic circuits to generate AND gate functionality. The clock signal CLK couples to a first input of the AND gate 310 and the control signal CON couples to a second input of the AND gate 310. Via this embodiment, the AND gate 310 outputs a buffered version of clock signal CLK whenever the control signal CON is in an active-high state.

During initialization of the interface control circuit 300 and/or a system hosting the interface control circuit 300, the counter circuit 304 is initialized at a pre-specified count value (referred to as the "initial count value"), possibly via a global reset signal (not shown). In one embodiment the counter circuit 304 uses an initial count value of zero (0), but is not so limited. The initial count value may be stored in a register or other memory area (not shown) that is included in and/or coupled to the counter circuit 304. During subsequent operations of the interface control circuit 300, edge transitions of each of the buffered strobe signal and the gated clock signal affect the count value of the counter circuit 304. An edge transition of the buffered strobe signal generally causes the counter value to adjust in one direction (first direction) while an edge transition of the gated clock signal generally causes the counter value to adjust in an opposite direction (second direction). Therefore, as an example, an edge transition of the buffered strobe signal may decrement the counter value of an embodiment while an edge transition of the gated clock signal increments the counter value. The edge transitions may be rising and/or falling edge transitions as appropriate to the host system.

The counter circuit 304 of an embodiment includes and/or couples to a count comparator circuit 306, also referred to as a count comparator 306. The count comparator circuit 306 receives information of the count value, and continually compares the count value with the initial count value; alternative embodiments may compare the count value with other values as appropriate to the system configuration. The count comparator circuit 306 generates the read-enable signal as an output signal in response to comparison results that satisfy a pre-defined condition or relation between the count value and the initial count value. As an example, for a system in which the initial count value is zero (count=0), the count comparator circuit 306 of an embodiment generates the read-enable signal in response to comparison results in which the count value is a non-zero value (count≠0). However, alternative embodiments may use other pre-defined conditions.

The interface control circuit 300 couples the read-enable signal output of the count comparator circuit 306 to a second logic circuit 320. The second logic circuit 320 also couples to receive the buffered strobe signal. The second logic circuit 320 of an embodiment includes an AND gate 320, but alternative embodiments may use any combination of logic circuits to generate AND gate functionality. The read-enable signal couples to a first input of the AND gate 320 and the buffered strobe signal couples to a second input of the AND gate 320. Via this embodiment, the AND gate 320 outputs a buffered version of the buffered strobe signal whenever the read-enable signal is in an active-high state.

The interface control circuit 300 of an embodiment includes a delay element 308 that couples to receive the gated, buffered strobe signal from the output of the second logic circuit 320. The delay element 308 applies a delay to the gated strobe signal. The delay applied by the delay element 308, which is set or controlled as described below, is approximately in a range of one-quarter clock cycle (90 degrees) to three-quarters of a clock cycle (270 degrees) of the clock signal CLK as appropriate to the host system signal timing, but is not so limited. The delay element 308 outputs a delayed version of the gated strobe signal as the read-FIFO clock signal. The read-FIFO clock signal couples to one or more components of the host system for use in data transfer operations between different timing domains.

Figure 6:
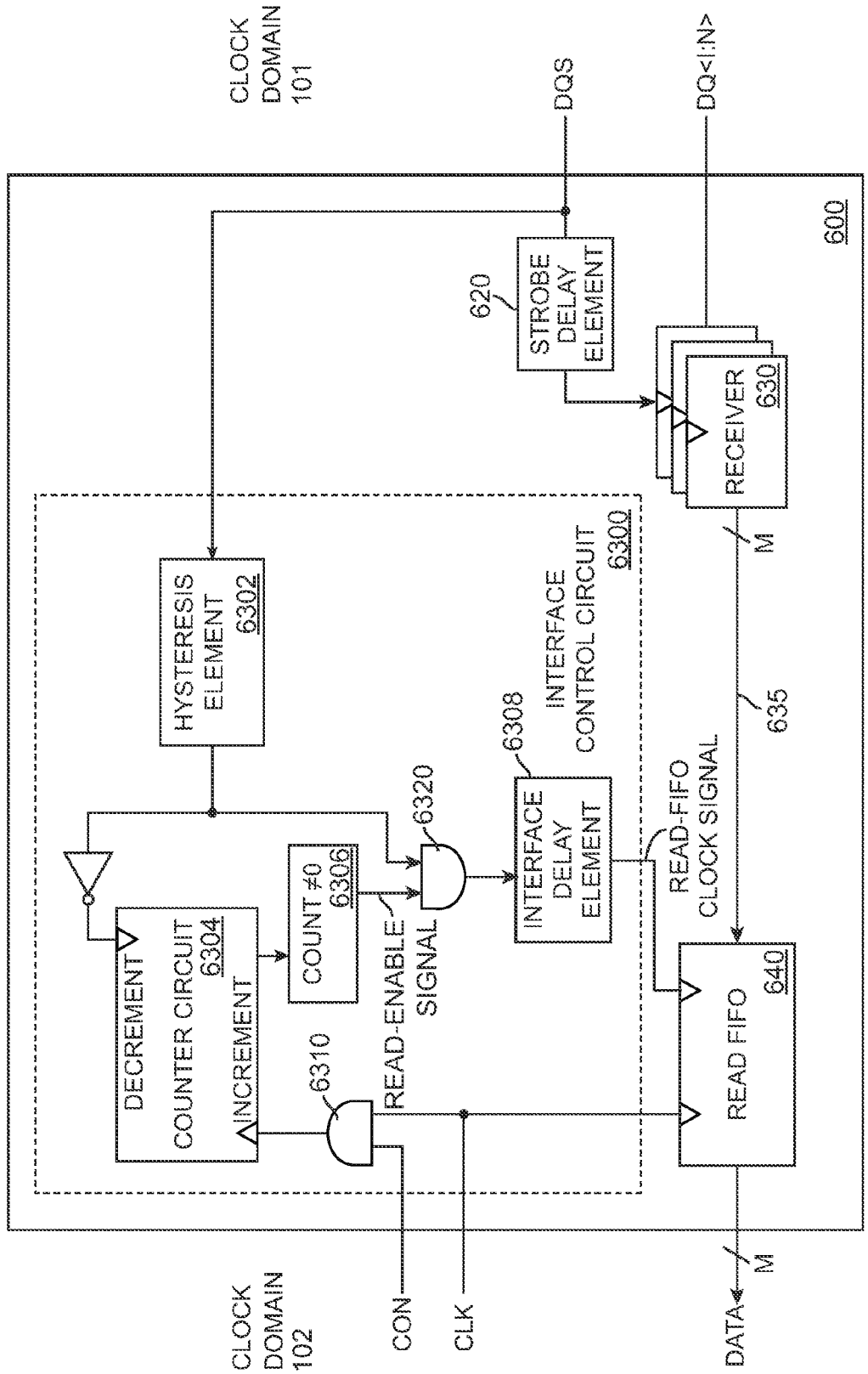
FIG. 6 is a self-timed strobe-based receiver circuit that includes an interface control circuit for generating read-FIFO clock signals for data read operations, under an embodiment.

Use of the read-FIFO clock signal in data transfer operations includes use of the read-FIFO clock signal to control data transfers into the FIFO buffer during read operations of a strobe-based memory system. For example, FIG. 6 is a self-timed strobe-based receiver circuit 600 that includes an interface control circuit 6300 for generating read-FIFO clock signals for use in data read operations, under an embodiment. The self-timed strobe-based receiver circuit 600 is a component of a strobe-based memory system for example. The strobe-based memory systems may include double data rate systems like DDR SDRAM as well as other variants, but are not limited to these memory systems.

The interface control circuit 6300 is a component of and/or coupled to one or more systems or devices (not shown) as appropriate to the self-timed strobe-based receiver circuit 600. In this example, the receiver circuit 600 includes one or more receivers 630, one or more read FIFOs 640, and the interface control circuit 6300. Each of the receivers 630 couple to sample data signals DQ<1:N> of individual data pins or lines originating from one or more components (not shown) of the memory system in the first clock domain 101, but are not so limited. The data signals DQ<1:N> may be transmitted from a memory component in a read operation, for example.

Each receiver 630 operates as an input sampler and receives as a sample-clock signal a delayed strobe signal DQS' from a strobe delay element 620. The delayed strobe signal DQS' is generated by the strobe delay element 620, and each strobe delay element 620 outputs a signal DQS' to the receivers used in sampling/receiving data signals DQ<1:N>. While a delayed strobe signal DQS' couples to a receiver of one data bit of an N-bit wide data byte, the self-timed strobe-based receiver circuit of various alternative embodiments may couple the delayed strobe signal DQS' to any number and/or combination of receivers, for example.

The amount of offset or delay of each strobe delay element 620 is as appropriate to the signaling protocol as well as the relative signal propagation delays of the data signal DQ<X> and the corresponding strobe signal DQS. The delay value may be calibrated or adjusted, for example, to optimally edge-align the data signal DQ<X> and corresponding strobe signal DQS, where the optimal edge-alignment can be with respect to the rising edge and/or falling edge of the data DQ<X> and strobe DQS signals, but is not so limited. The delay of a typical embodiment is approximately one-quarter cycle (i.e., approximately 90 degrees) of the clock signal CLK, but is not so limited. The receiver 630 outputs the sampled/received data on a number "M" of data lines 635.

The read FIFO 640 couples to one or more of the receivers 630 via the data lines 635. The read FIFO 640 stores the sampled data from the receivers 630, where this storage or 'writing" is under control of a clock signal originating from the interface control circuit 6300. The FIFOs contents are transmitted or "read" to other components (not shown) under control of a clock signal CLK originating from the second clock domain 102. While the read FIFO 640 of this embodiment is a FIFO-type buffer, alternative embodiments can use any type of buffer or device for transferring data between two clock domains.

As described above with reference to FIGS. 1-5, the interface control circuit 6300 generates the read-FIFO clock signal. The interface control circuit 6300 includes a counter circuit 6304 that couples to a hysteresis element 6302 and multiple logic circuits 6310/6320. The hysteresis element 6302, as described above in reference to FIG. 4, couples to receive the strobe signal DQS from the first clock domain into the interface control circuit 6300. The interface control circuit 6300 operates as described above in reference to the interface control circuit 300 of FIG. 3.

Figure 7:
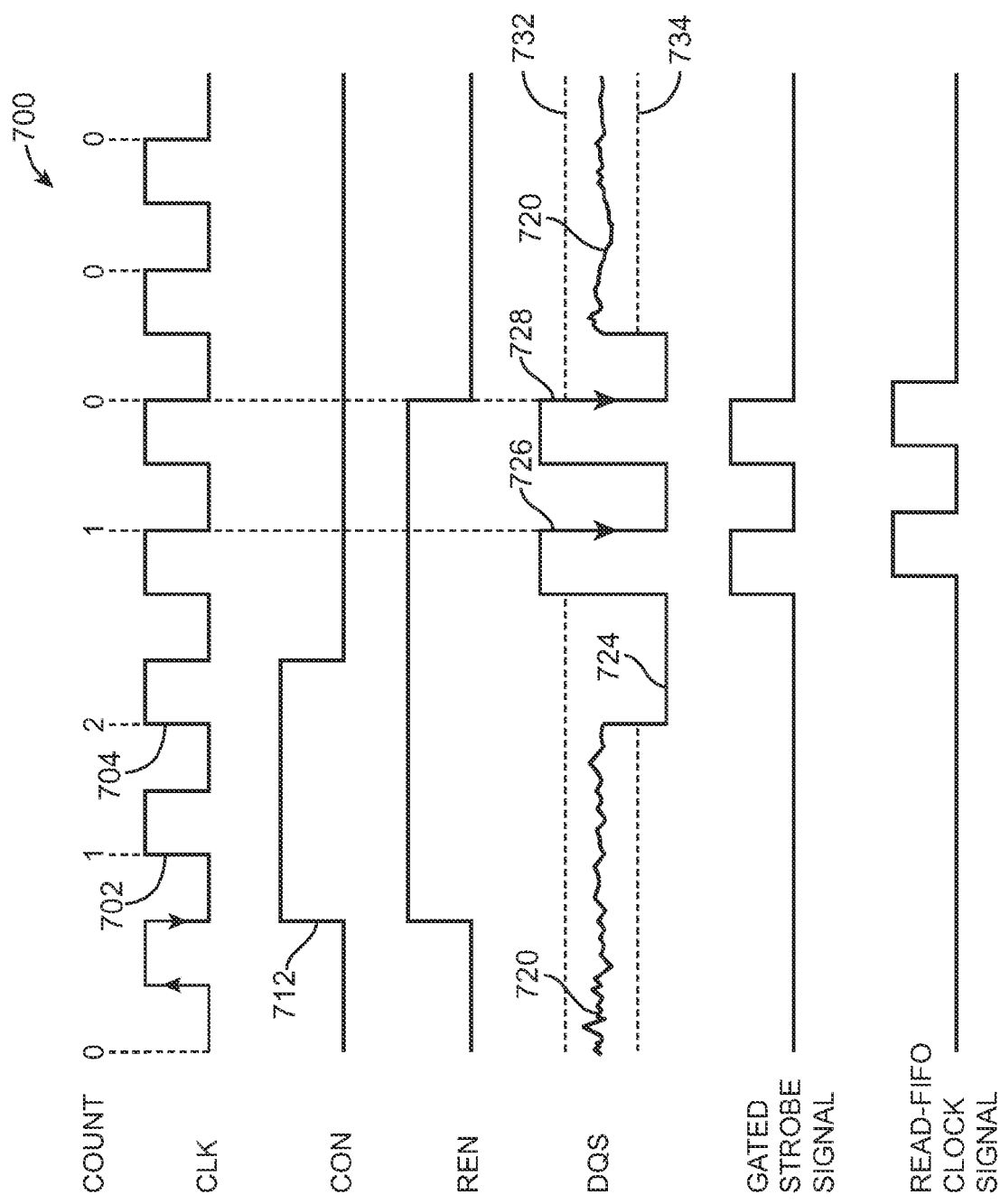
FIG. 7 is an example signal timing diagram that includes signals of the self-timed strobe-based receiver circuit, under an embodiment.

As an example of interface control circuit 6300 operation, FIG. 7 is an example signal timing diagram 700 that includes signals of the self-timed strobe-based receiver circuit 600, under an embodiment. With reference to FIG. 6, the signals include the clock signal CLK, read-active control signal CON, read-enable signal REN, strobe signal DQS, gated strobe signal, and read-FIFO clock signal. The count value is also shown. The relative timing 700 of these signals is provided for purposes of this example and is not to limit relative signal timing of the receiver circuit 600.

This example assumes the interface control circuit 6300 includes an initial count value of zero (0) prior to data read operations. The counter circuit 6304 increments the count to a value of one (1) in response to a first rising edge 702 of the clock signal CLK that occurs while the control signal CON is asserted 712, and the count comparator circuit 6306 asserts the read-enable signal REN in response to the non-zero count value. The counter circuit 6304 increments the count to a value of two (2) in response to a second rising edge 704 of the clock signal CLK while the count comparator circuit 6306 continues to assert the read-enable signal REN in response to the non-zero count value.

The hysteresis element 6302, as described above, is a comparator or detector that improves tolerance to noise of the strobe signal DQS (in a high-impedance or inactive state 720) during high-speed operations through the use of first 732 and second 734 voltage thresholds. Voltage levels of the strobe signal DQS therefore trigger detection of a valid region 724 of the strobe signal when falling below both the first 732 and second 734 voltage thresholds. Consequently, the falling-edge transition that corresponds to the valid region 724 of strobe signal DQS triggers an output signal (buffered strobe signal) from the hysteresis element 6302.

The interface control circuit 6300 couples the buffered strobe signal to the second logic circuit 6320 along with the asserted read-enable signal REN from the counter circuit 6304. As the read-enable signal REN is asserted, the second logic circuit 6320 outputs the buffered strobe signal as the gated strobe signal. The receiver circuit 600 couples the gated strobe signal to the read FIFO 640 thru an interface delay element 6308 as described above. In response to the output of the interface delay element 6308, the read FIFO 640 stores the sampled data from the receivers 630.

The counter circuit 6304 decrements the count to a value of one (1) (from the current value of two (2)) in response to a first falling edge 726 of the buffered strobe signal DQS, and the count comparator circuit 6306 continues to assert the read-enable signal REN in response to the non-zero count value. The counter circuit 6304 further decrements the count to a value of zero (0) in response to a second falling edge 728 of the buffered strobe signal DQS, and the count comparator circuit 6306 de-asserts the read-enable signal REN in response to this zero (0) count value. The second logic circuit 6320 ceases output of the gated strobe signal upon de-assertion of the read-enable signal REN and the read FIFO 640 ceases storing the sampled data from the receivers 630.

Figure 8:
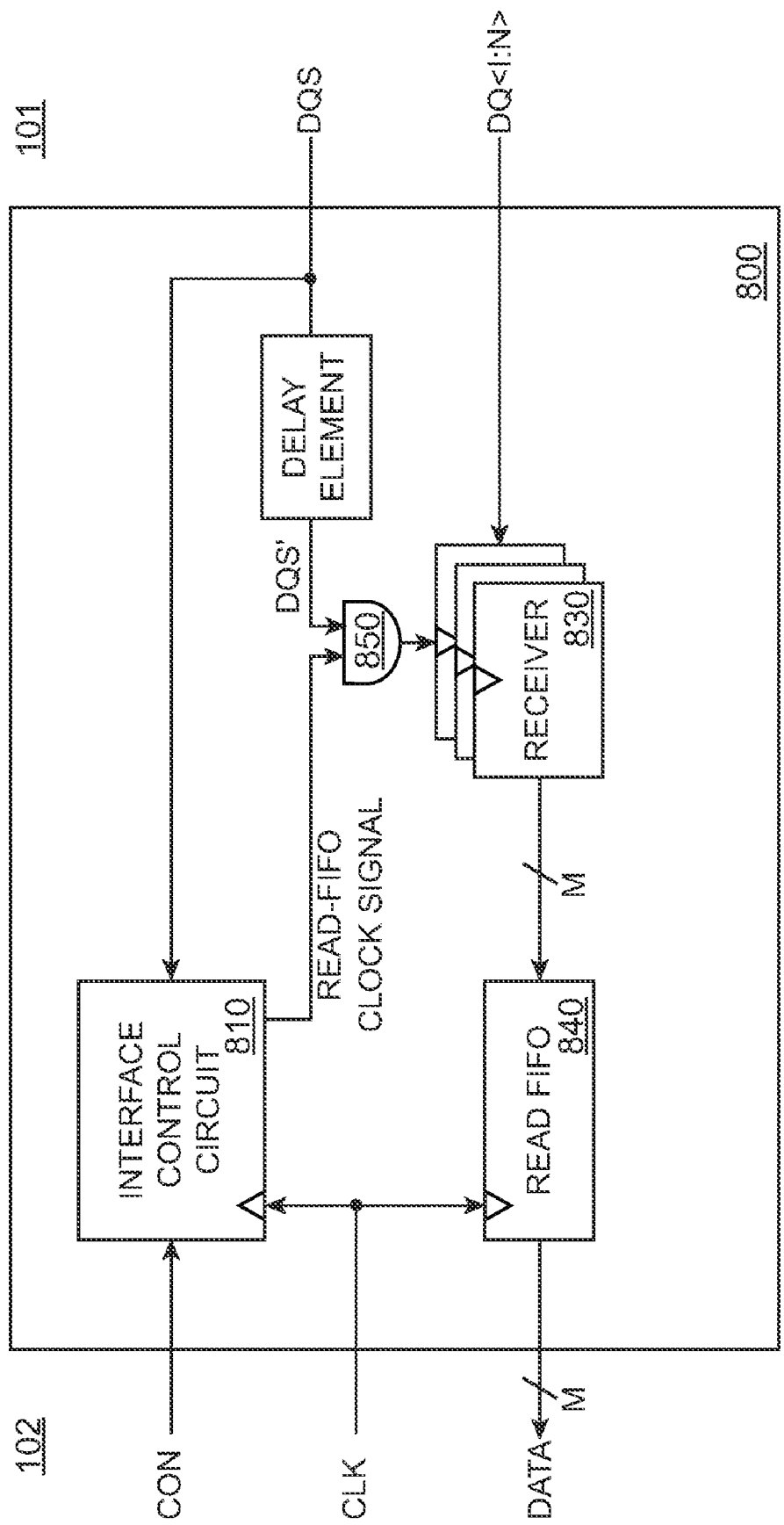
FIG. 8 is a self-timed strobe-based receiver circuit that includes an interface control circuit for generating interface enable signals for data sampling operations, under an embodiment.

The self-timed strobe-based receiver circuit of an alternative embodiment may use the read-enable signal of an embodiment to gate the delayed strobe signal DQS' coupling to the receivers. FIG. 8 is a receiver circuit 800 that includes an interface control circuit 810 for generating read-FIFO clock signals for use in data sampling operations, under an embodiment. The receiver circuit 800 couples to the read-active control signal CON and clock CLK signals of the second domain 102, and the strobe signal DQS and data signals DQ<1:N> of the first domain 101, as described above. The interface control circuit 810 generally functions as described above with reference to FIGS. 1-7. However, instead of using the read-FIFO clock signal to control receipt of data into the read FIFO 840, the receiver circuit 800 couples the delayed strobe signal DQS' to a logic circuit 850 along with the read-FIFO clock signal from the interface control circuit 810. Thus, the receivers 830 sample or receive data of the data signals DQ<1:N> in response to the delayed strobe signal DQS' as gated by the read-FIFO clock signal.

The delay elements described above may include any number of circuits that generate/control delay elements and/or apply delays or offsets to a received signal in order to produce a delayed signal, as described above. As one example the delay circuit includes a number of delay elements that couple to receive a clock signal (e.g., clock signal CLK) and are slaved to a delay-locked loop ("DLL"). Components of the delay circuit select one of the delayed signals for use in generating an appropriate delay. The selection/adjustment of an amount of delay to be applied to a received signal is performed in response to information of signal parameters of the host system and/or the self-timed interface. Examples of the signal parameters include one-way signal propagation delays, round-trip propagation delays, the intrinsic cycle-based delays of the system, the signal propagation time between components of the host system, as well as intrinsic delays of devices of the various system components and circuits, to name a few.

The delay elements of an embodiment also control the respective delays or offsets within a pre-specified range in response to variations in operating and/or environmental parameters of the host system and/or self-timed interface circuit. The operating or process parameters include, for example, the speed of operation, but can include numerous other parameters as appropriate. The environmental parameters include, for example temperature and/or power supply voltage, but can include numerous other parameters as appropriate.

The components of the self-timed interfaces described above include any collection of computing components and devices operating together. The components of the self-timed interfaces can also be components or subsystems within a larger computer system or network. Components of the self-timed interfaces can also be coupled among any number of components (not shown), for example other buses, controllers, memory devices, and data input/output (I/O) devices, in any number of combinations. Many of these system components may be soldered to a common printed circuit board (for example, a graphics card or game console device), or may be integrated in a system that includes several printed circuit boards that are coupled together in a system, for example, using connector and socket interfaces such as those employed by personal computer motherboards and dual inline memory modules ("DIMM"). In other examples, complete systems may be integrated in a single package housing using a system in package ("SIP") type of approach. Integrated circuit devices may be stacked on top of one another and utilize wire bond connections to effectuate communication between chips or may be integrated on a single planar substrate within the package housing.

Further, functions of the self-timed interfaces can be distributed among any number/combination of other processor-based components. The self-timed interfaces described above include, for example, various dynamic random access memory (DRAM) systems. As examples, the DRAM memory systems can include double data rate ("DDR") systems like DDR SDRAM as well as DDR2 SDRAM and other DDR SDRAM variants, such as Graphics DDR ("GDDR") and further generations of these memory technologies, i.e., GDDR2, and GDDR3, but is not limited to these memory systems.

Aspects of the self-timed interfaces described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the self-timed interfaces include: microcontrollers with memory (such as electronically erasable programmable read only memory (EEPROM)), embedded microprocessors, firmware, software, etc. Furthermore, aspects of the self-timed interfaces may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that the various circuits disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and HLDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.).

When received within a computer system via one or more computer-readable media, such data and/or instruction-based expressions of the above described circuits may be processed by a processing entity (e.g., one or more processors) within the computer system in conjunction with execution of one or more other computer programs including, without limitation, netlist generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the self-timed interfaces is not intended to be exhaustive or to limit the self-timed interfaces to the precise form disclosed. While specific embodiments of, and examples for, the self-timed interfaces are described herein for illustrative purposes, various equivalent modifications are possible within the scope of the self-timed interfaces, as those skilled in the relevant art will recognize. The teachings of the self-timed interfaces provided herein can be applied to other processing systems and methods, not only for the systems and methods described above.

The elements and acts of the various embodiments described above can be combined to provide further embodiments. These and other changes can be made to the self-timed interfaces and methods in light of the above detailed description.

In general, in the following claims, the terms used should not be construed to limit the self-timed interfaces and methods to the specific embodiments disclosed in the specification and the claims, but should be construed to include all processing systems that operate under the claims. Accordingly, the self-timed interfaces are not limited by the disclosure, but instead the scope of the self-timed interfaces is to be determined entirely by the claims.

While certain aspects of the self-timed interfaces are presented below in certain claim forms, the inventor contemplates the various aspects of the self-timed interfaces in any number of claim forms. For example, while only one aspect of the self-timed interfaces is recited as embodied in machine-readable media, other aspects may likewise be embodied in machine-readable media. Accordingly, the inventor reserves the right to add additional claims after filing the application to pursue such additional claim forms for other aspects of the self-timed interfaces.

What is claimed is:

1. An apparatus to transfer a signal from a first timing domain to a second timing domain, the apparatus comprising:
a sampler to sample the signal responsive to a first timing reference associated with the first timing domain;
a buffer circuit to transfer samples from the sampler to the second timing domain responsive to a second timing reference associated with the second timing domain; and
logic to filter transitions of the first timing reference and responsively generate a third timing reference;
where the transfer of samples from the sampler by the buffer circuit is gated by the third timing reference.

2. The apparatus of claim 1, where the third timing reference represents a function of the first timing reference and an enable signal.

3. The apparatus of claim 1, where the logic produces transitions in the third timing reference responsive to transitions in the first timing reference representing greater than a threshold amount of signal change and does not produce transitions in the third timing reference for transitions in the first timing reference less than the threshold amount.

4. The apparatus of claim 3, where the logic includes a Schmitt trigger, the third timing reference dependent upon an output of the Schmitt trigger.

5. The apparatus of claim 1, where the logic includes a counter circuit that is incremented responsive to one of the first timing reference and the second timing reference and decremented responsive to the other of the first timing reference and the second timing reference, the third timing reference generated in dependence upon an output of the counter circuit.

6. The apparatus of claim 5, where the buffer circuit is loaded responsive to the third timing reference and unloaded responsive to the second timing reference.

7. The apparatus of claim 5, further comprising a gate that receives a control signal and inhibits the counter responsive to a state of the control signal.

8. The circuit of claim 1, where the first timing reference is a strobe signal.

9. The apparatus of claim 1, where the logic filters transitions of the first timing reference to generate the third timing reference responsive to an input associated with the second timing domain.

10. The apparatus of claim 9, where the input associated with the second timing domain is the second timing reference.

11. The apparatus of claim 9, where the input associated with the second timing domain is a control signal.

12. The apparatus of claim 9, where the logic includes a hysteresis element, a counter and an AND gate, the hysteresis element generating a hysteresis signal responsive to filtered transitions in the first timing reference, the counter incremented by one of the first and second timing references and decremented by the other of the first and second timing references and producing a counter output representing a predetermined state of the counter, and the AND gate producing the third timing reference as a function of the counter output and the hysteresis signal.

13. The apparatus of claim 1, further comprising a delay element to delay the first timing reference and produce a delayed output, the sampler sampling the signal responsive to the delayed output.

14. The apparatus of claim 1, further comprising a delay element to delay the third timing reference and produce a delayed output, the transfer of samples gated responsive to the delayed output.

15. The apparatus of claim 1, embodied in a controller for use in a memory system, where the signal represents read data.

16. An apparatus to transfer data from a first timing domain to a second timing domain, the method comprising:
means for sampling a signal in response to a first timing reference, the first timing reference associated with the first timing domain;
means for outputting samples from the means for sampling to the second timing domain according to timing of a second timing reference; and
means for gating the transfer of samples from the means for sampling to the second timing domain responsive to filtered transitions of the first timing reference.

17. A method of transferring data from a first timing domain to a second timing domain, the method comprising:
sampling a signal to generate samples in response to a first timing reference, the first timing reference associated with the first timing domain;
buffering the samples responsive to a gating signal, the gating signal based on filtered transitions of the first timing reference; and
transferring buffered samples into the second timing domain in response to a second timing reference associated with the second timing domain.

18. The method of claim 17, further comprising generating the gating signal to have transitions corresponding to transitions in the first timing reference greater than a threshold amount of signal change and to not have transitions corresponding to transitions in the first timing reference less than the threshold amount of signal change.

19. A method of receiving read data, the method comprising:
sampling a signal representing the read data to generate sampled data in response to a first timing reference, the first timing reference associated with a first timing domain;
buffering the sampled data upon occurrence of a condition; and
outputting buffered data in response to a second timing reference;
where the occurrence of the condition is responsive to filtered transitions of the first timing reference.

20. The method of claim 19, where occurrence of the condition is further responsive to an enable signal.

21. The method of claim 20, further comprising generating the enable signal as a logical function of at least one of (a) a control signal or (b) transitions of the second timing reference.

22. The method of claim 19, where the first timing reference is a strobe signal.

23. The method of claim 19, where the occurrence of the condition is further responsive to transitions in the first timing reference greater than a threshold amount of signal change and to not have transitions corresponding to transitions in the first timing reference less than the threshold amount of signal change.

* * * * *